United States Patent [19]
Jansen, Jr. et al.

[11] Patent Number: 5,550,606
[45] Date of Patent: Aug. 27, 1996

[54] CAMERA WITH MAGNETICALLY MOVABLE LIGHT BLOCKING SHIELD

[75] Inventors: Wilbert F. Jansen, Jr., Shortsville; Ivsey N. Chernobilsky, Rochester, both of N.Y.

[73] Assignee: Eastman Kodak Company, Rochester, N.Y.

[21] Appl. No.: 294,691

[22] Filed: Aug. 23, 1994

[51] Int. Cl.⁶ ............................ G03B 37/00; G03B 17/02
[52] U.S. Cl. .................................. 354/94; 354/159
[58] Field of Search ............................... 354/94, 159

[56] References Cited

U.S. PATENT DOCUMENTS

| | | | |
|---|---|---|---|
| 4,051,499 | 9/1977 | Kondo | 354/234 |
| 4,180,314 | 12/1979 | Koch et al. | 354/159 |
| 4,195,277 | 3/1980 | Leicht | 335/229 |
| 4,221,163 | 9/1980 | Anderson | 101/93.01 |
| 4,313,659 | 2/1982 | Saito et al. | 354/234 |
| 4,334,748 | 6/1982 | Stacklies et al. | 354/234 |
| 4,384,774 | 5/1983 | Tuck | 354/159 |
| 4,514,065 | 4/1985 | Carrera | 354/235.1 |
| 4,638,193 | 1/1987 | Jones | 310/15 |
| 4,706,055 | 11/1987 | Uetsuhara | 335/229 |
| 4,716,427 | 12/1987 | Shyu | 354/159 |
| 4,752,757 | 6/1988 | Uetsuhara | 335/230 |
| 4,847,726 | 7/1989 | Mody | 361/147 |
| 4,881,054 | 11/1989 | Polgar | 335/230 |
| 4,973,997 | 11/1990 | Harvey | 354/106 |
| 5,010,357 | 4/1991 | Misawa | 354/159 |
| 5,086,311 | 2/1992 | Naka et al. | 354/195.1 |
| 5,170,144 | 12/1992 | Nielsen | 335/229 |
| 5,305,051 | 4/1994 | Irie et al. | 354/441 |
| 5,307,111 | 4/1994 | Kurei | 354/402 |
| 5,327,183 | 7/1994 | Kurei | 354/129 |

FOREIGN PATENT DOCUMENTS

| | | | |
|---|---|---|---|
| 3-153225 | 7/1991 | Japan | G03B 17/28 |
| 3-204631 | 9/1991 | Japan | G03B 17/18 |
| 5-297447 | 11/1993 | Japan | 354/159 |
| 6-186634 | 7/1994 | Japan | 354/159 |
| 2254704 | 10/1992 | United Kingdom | G03B 13/36 |

*Primary Examiner*—Michael L. Gellner
*Assistant Examiner*—Eddie C. Lee
*Attorney, Agent, or Firm*—David A. Howley

[57] ABSTRACT

A camera includes a taking lens and at least one light blocking shield which is movable between (1) a light blocking position in which light passing through the taking lens is partially blocked from reaching an image recording surface such that a reduced size image can be recorded on the image recording surface and (2) a normal position in which light passing through the taking lens is not blocked by the light blocking shield such that a normal image can be recorded on the image recording surface. The light blocking shield is magnetically moved between the light blocking and normal positions. The light blocking shield is also magnetically held at the light blocking or normal position.

6 Claims, 8 Drawing Sheets

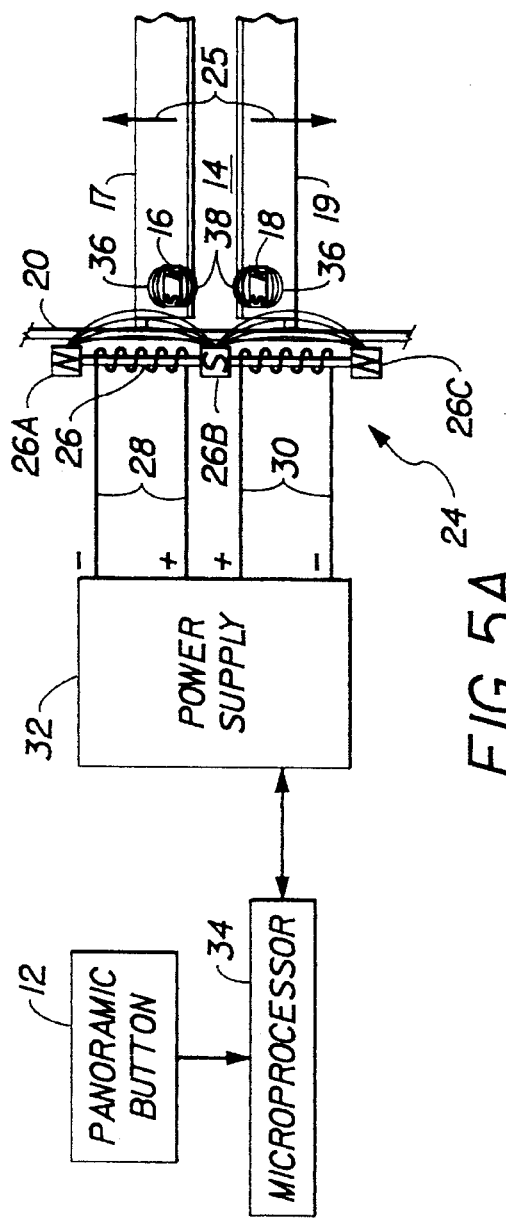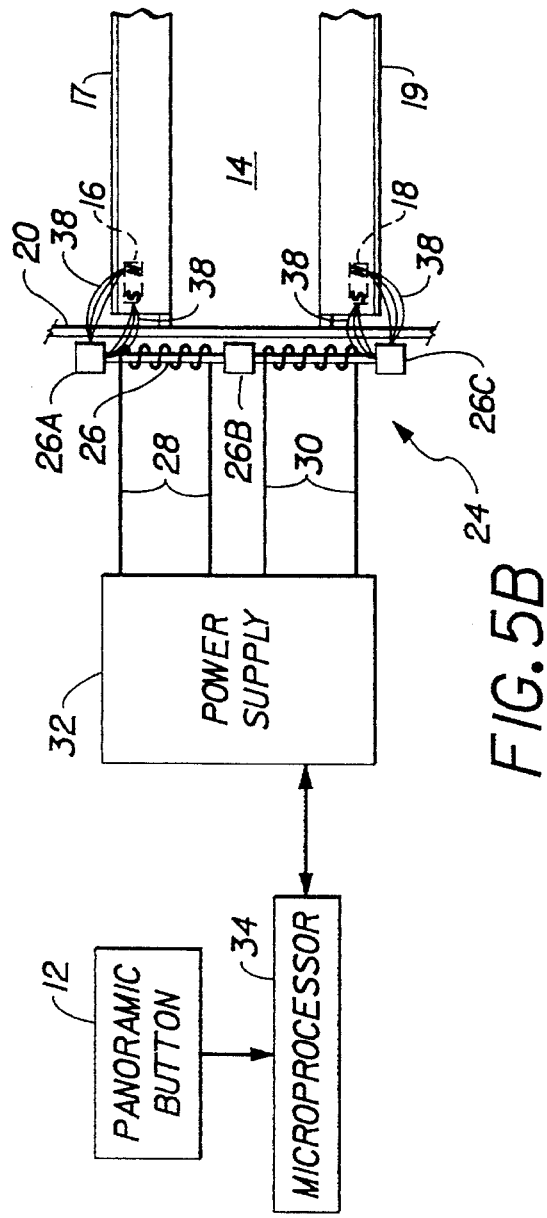

CAMERA WITH MAGNETICALLY MOVABLE LIGHT BLOCKING SHIELD

CROSS-REFERENCE TO RELATED APPLICATION

Reference is made to commonly assigned copending application Ser. No. 08/090,850, filed on Jul. 12, 1993 in the names of Fox et al., U.S. Pat. No. 5,363,160 which is assigned to the assignee of this application.

FIELD OF THE INVENTION

The invention relates generally to the field of photography, and in particular to cameras. More specifically, the invention relates to a camera with a magnetically movable light blocking shield.

BACKGROUND OF THE INVENTION

U.S. Pat. No. 5,086,311 (the '311 patent) discloses a panoramic camera with masking plates selectively movable for masking the exposure aperture so as to form a picture of a panoramic size or for opening the whole exposure aperture to form a picture of standard size. As shown in FIG. 2 of the '311 patent, a complex mechanical linkage is used to move the masking plates between their two positions. A camera operator moves a knob 36 between two positions to move the masking plates via the linkage. Included in the linkage are a drive lever 22, an upper lever 23, a charging spring 24, a lower lever 26, a restoration spring 28, a slide lever 32, a coupling portion 33, and so on.

The mechanical linkage of the '311 patent involves a large number of parts which both increases the size and cost of the camera. Additionally, the mechanical linkage must intrude into a light locked chamber within the camera in order to move the masking plates. Such intrusion requires the addition of light blocking features, such as a light shroud, at the point of intrusion to prevent light from entering the chamber. The necessity of a light blocking feature further increases the size and cost of the camera. Further, a camera operator must apply force to a switch to mechanically move the masking plates from one position to another. Such force is greater than the force required to close an electrical switch, and thus, the camera is not as user friendly as it could be.

The Olympus Stylus Panoramic camera includes a pair of panoramic blades which are mechanically moved, via a linkage, between the panoramic and normal positions. A pair of permanent magnets on the back cover of the camera hold the blades in the panoramic position during panoramic photography.

SUMMARY OF THE INVENTION

The present invention is directed to overcoming one or more of the problems set forth above. Briefly summarized, according to one aspect of the present invention, a camera includes a taking lens and at least one light blocking shield which is movable between (1) a light blocking position in which light passing through the taking lens is partially blocked from reaching an image recording surface such that a reduced size image can be recorded on the image recording surface and (2) a normal position in which light passing through the taking lens is not blocked by the light blocking shield such that a normal image can be recorded on the image recording surface. The light blocking shield is magnetically moved between the light blocking and normal positions.

By magnetically moving the light blocking shield between its light blocking and normal positions, the number of parts to effect such movement is greatly decreased, thereby reducing the size and cost of the camera.

These and other aspects, objects, features and advantages of the present invention will be more clearly Understood and appreciated from a review of the following detailed description of the preferred embodiments and appended claims, and by reference to the accompanying drawings.

BRIEF DESCRIPTION OF THE DRAWINGS

FIGS. 5A and 5B are rear views of a portion of a light blocking shield having a permanent magnet mounted on one end thereof, and an electromagnet;

DETAILED DESCRIPTION OF THE PREFERRED EMBODIMENT

The invention is disclosed as being embodied in a relatively simple 35 mm still camera. Because such a photographic camera is well known, the description which follows is directed in particular to camera elements forming part of or cooperating directly with the preferred embodiment. It is to be understood, however, that camera elements not specifically shown or described may take various forms known to persons of ordinary skill in the art.

Figure 1:
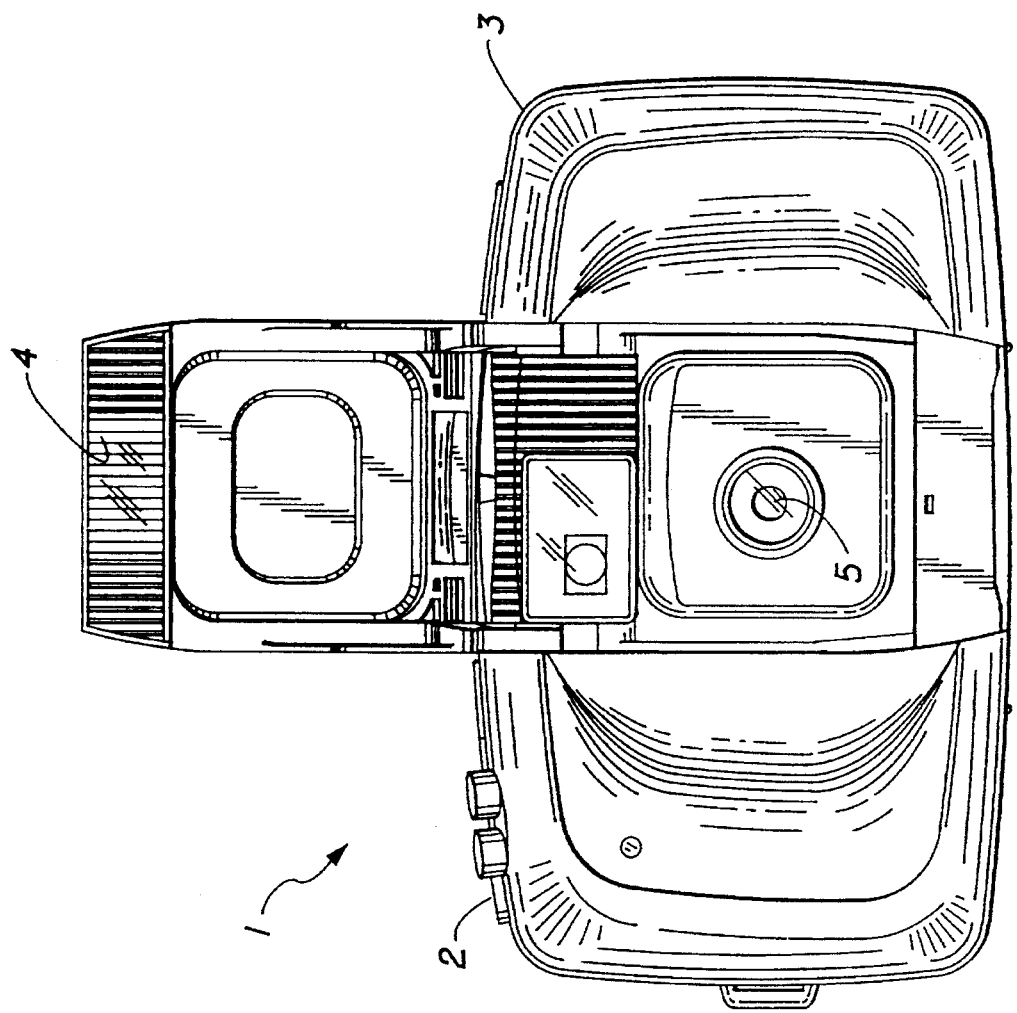
FIG. 1 is a front view of a photographic camera according to a preferred embodiment of the invention.
Figure 2:
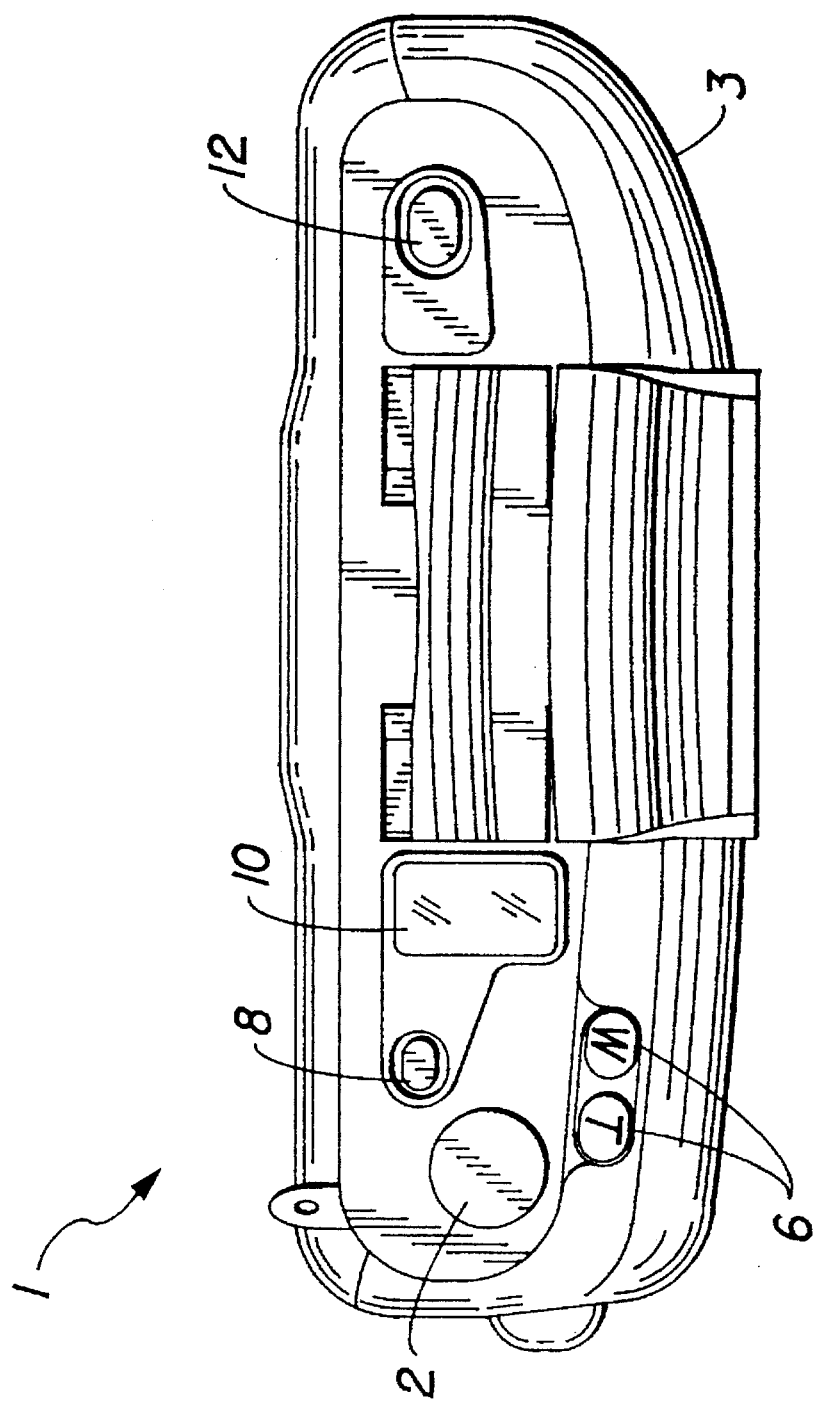
FIG. 2 is a top view of the camera of FIG. 1.

Referring now to FIGS. 1 and 2 of the drawings, a photographic camera 1 has a camera body or housing 3 with a known taking lens 5, a shutter button 2, a shutter (not shown) and a flash 4. The camera includes a pair of buttons "T" (telephoto) and "W" (wide angle) for controlling an operation of a zoom lens system within the camera. A mode button 8 is successively pressed to select various camera functions such as fill flash, self-timer, etc. When these modes are selected, an identifying icon is presented on a liquid crystal display (LCD) 10. A panoramic button 12 is pressed to choose between panoramic photography and normal photography. When panoramic photography is selected, an identifying icon appears on LCD 10 and a vertically reduced image will be recorded by the camera.

Figure 3:
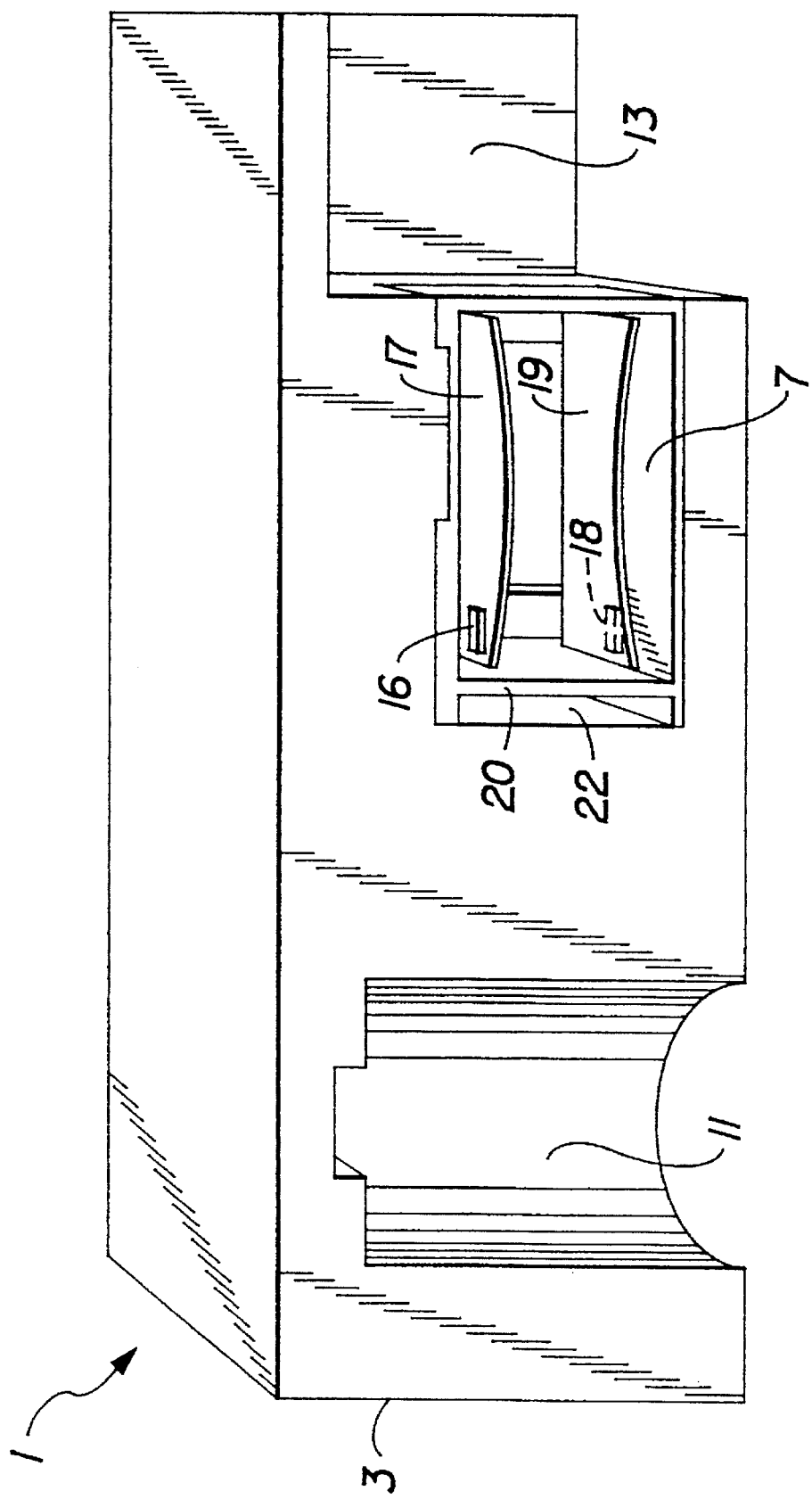
FIG. 3 is a rear perspective view, showing a pair of light blocking shields in a light blocking position within a back frame opening of the camera body to make a panoramic size exposure on a filmstrip.
Figure 6:
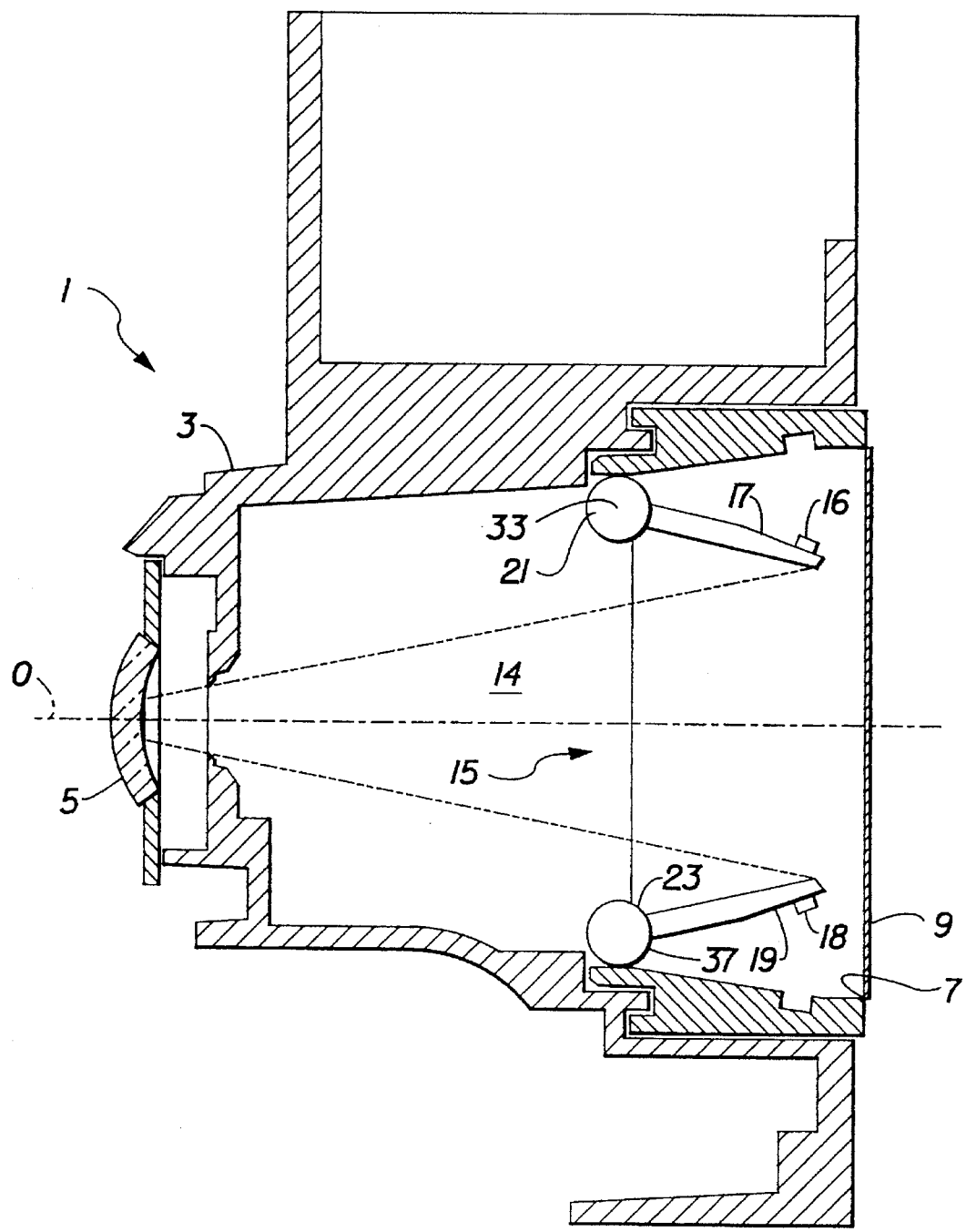
FIG. 6 is a side elevation view of the camera body, showing the light blocking shield assemblage with its pair of light blocking shields in their light blocking position.

Referring now to FIGS. 3 and 6 of the drawings which show internal portions of camera 1, a back frame opening 7 is displayed which is centered on an optical axis 0 of the taking lens. The back frame opening 7 is rectangular shaped for making full size (about 24.4 mm×36.4 mm) exposures on respective sections of a 35 mm filmstrip 9 successively held at the back frame opening by a pressure plate (not shown). Optionally, an electronic image sensor can be used in place of filmstrip nine to capture images. A light-locked chamber 14 is defined by camera body 3 and film 9. The camera body 3 has a cartridge receiving chamber 11 for a conventional 35 mm film cartridge (not shown) which normally contains the filmstrip 9 and another chamber 13 for holding the filmstrip removed from the film cartridge.

A light blocking shield assemblage 15, preferably made of plastic (e.g. polypropylene or polyethylene), comprises a pair of similarly dimensioned light blocking shields 17 and 19 with respective pivot shafts 21 and 23. The light blocking shields 17 and 19 and their respective pivot shafts 21 and 23 are each preferably integral, that is, they are formed as a unit to be one-piece or unitary. A pair of permanent magnets 16, 18 are respectively attached by adhesive or other means to a back side of shields 17, 19. Magnets 16, 18 are preferably made of cold pressed neodinium iron boron. An opaque wall 20 separates a chamber 22 from the shields and permanent magnets. An electromagnet is located within the chamber 20 and is used to move shields 17, 19, via permanent magnets 16, 18, between their panoramic and normal positions (to be described in further detail below).

Figure 4:
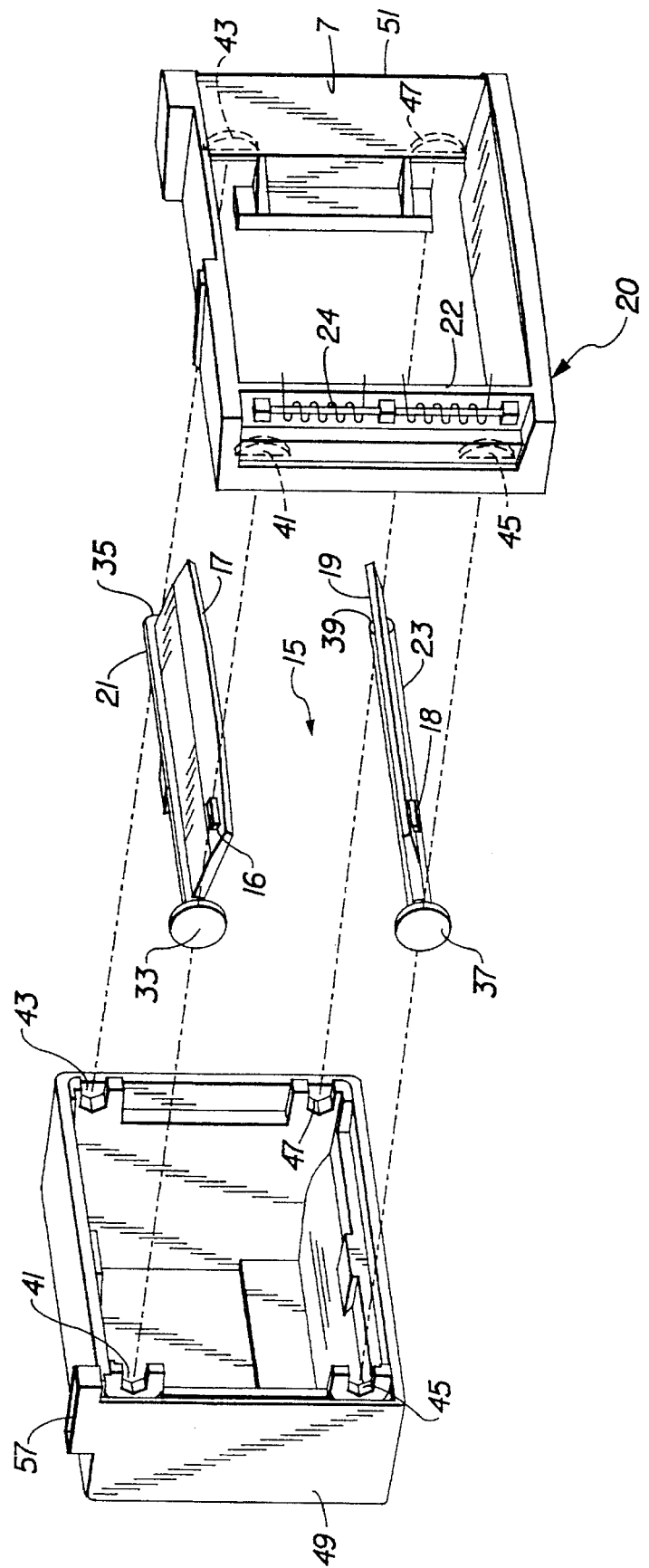
FIG. 4 is an exploded perspective view of a light blocking shield assemblage including the pair of light blocking shields, and front and rear mounting supports within the camera body for the light blocking shield assemblage.

As viewed in FIG. 4, the four opposite ends 33, 35, 37, and 39 of the pivot shafts 21 and 23 fit into respective bearing recess-halves 41, 43, 45, and 47 of mating front and rear mounting elements 49 and 51 of the camera body 3 to support the light blocking shields 17 and 19 for pivotal movement in opposite directions between a light blocking position and a non-light blocking position. An electromagnet 24 is shown in chamber 22 adjacent wall 20.

Referring to FIGS. 5A and 5B, electromagnet 24 includes an iron core 26 having a greater mass of iron at ends 26A, 26C and middle portion 26B than in between the ends and middle. The iron core is shaped this way to provide an effective electromagnetic field for moving and holding shields 17, 19. A pair of copper wires 28, 30, which are covered with an electrically insulating material, are wrapped around a portion of core 26 between ends 26A, 26B and middle portion 26B and connected to a power supply 32. Power supply 32 is in turn connected to a microprocessor 34 which is connected to panoramic button 12.

Assume a camera operator had just finished taking a panoramic picture and desired to next take a normal picture. In order to move the light blocking shields 17 and 19 from their light blocking position of FIG. 5A to their non-light blocking position of FIG. 5B, the operator would first press panoramic button 12 to deselect panoramic photography. Only minimal force need be applied to button 12 to close an electrical switch. As such, the present invention offers an advantage over the prior art in which a greater force is required to mechanically move the light blocking shields. Microprocessor 34 senses that panoramic button 12 has been pressed to select normal photography and instructs power supply 32 to apply a direct current (DC) of preferably about 0.5 to 1 amps for preferably about 10 milliseconds to copper wires 28, 30 in the polarity shown in FIG. 5A.

This momentary direct current causes north poles to be present in core 26 at ends 26A, 26C and a south pole to be present at middle portion 26B. An electromagnetic field 36 is thereby created which has a higher density near wires 28, 30 than away from the wires. Electromagnetic field 36 has a greater influence on the south poles of the permanent magnet than on the north poles because the south poles are closer to wires 28, 30. As such, magnets 16, 18 are repelled from middle portion 26B of the iron core and attracted to end portions 26A and 26C. The magnetic field strengths of the electromagnet and permanent magnets are designed to rapidly move the shields between the panoramic and normal positions.

Figure 7:
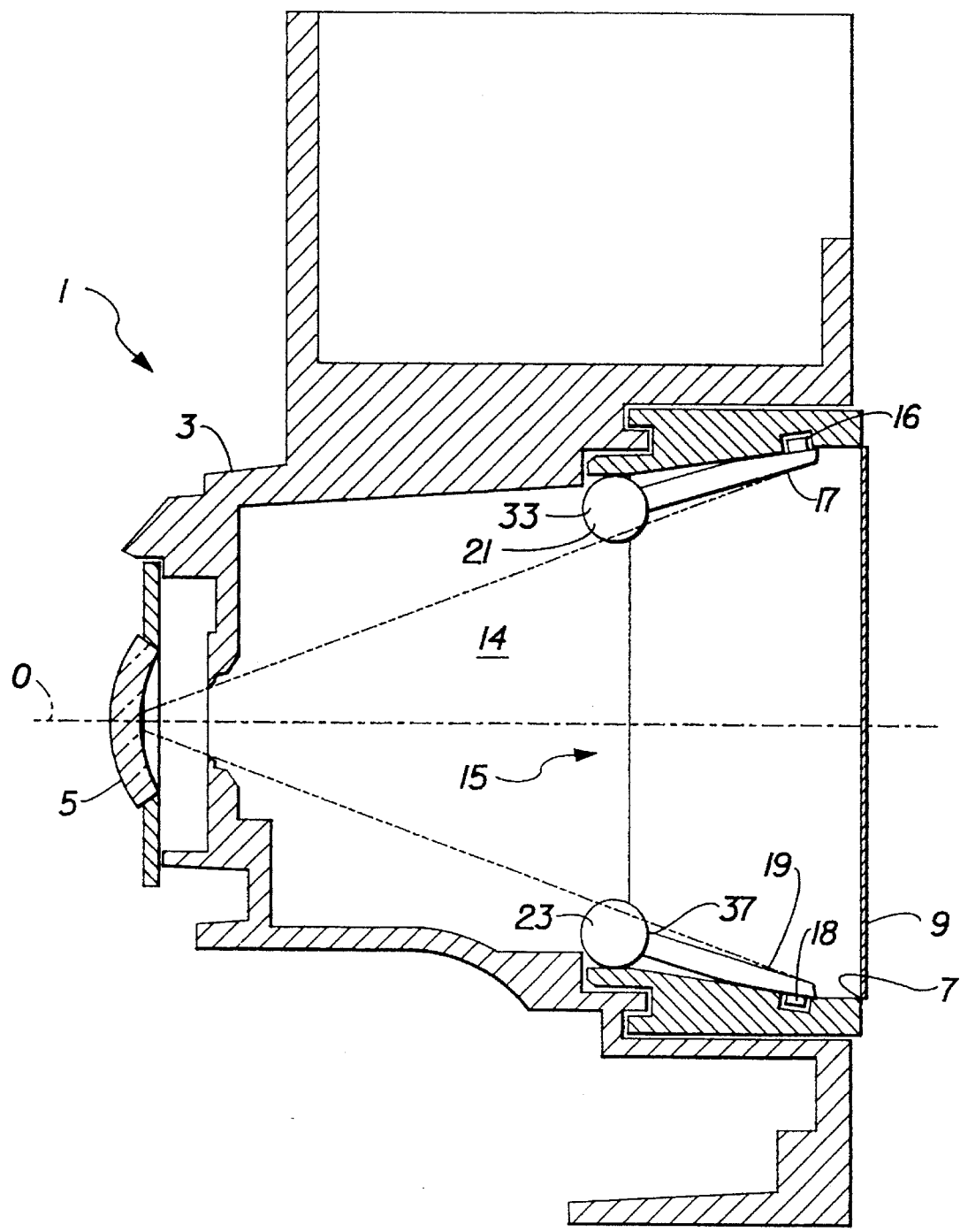
FIG. 7 is a side elevation view similar to FIG. 6, showing the light blocking shield assemblage with its pair of light blocking shields in their non-light blocking position.
Figure 8:
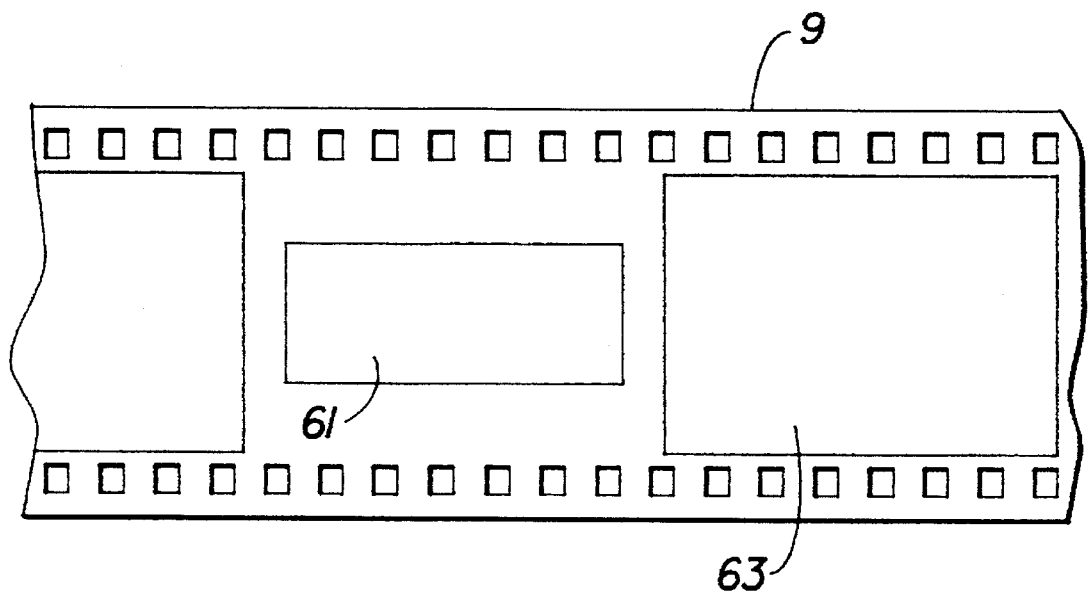
FIG. 8 is a plan view of a filmstrip with interspersed full size and panoramic size exposures.

Thus, the light blocking shields 17 and 19 will be swung in opposite directions shown by arrows 25 away from each other to their non-light blocking position. Such movement of the shields is accomplished without a mechanical link or springs intruding into light locked chamber 14. Consequently, no light shroud is required resulting in a simplified camera body. See FIG. 7. In the non-light blocking position, the light blocking shields 17 and 19 do not mask the uppermost rectangular portion and the lowermost rectangular portion of the back frame opening 7. Instead, they allow a full size (about 24.4 mm×36.4 mm) exposure 63 to be made on the filmstrip 9 at the back frame opening. See FIG. 8. Shields 17, 19 are held in their non-light blocking position after the DC current is shut off due to stray magnetic fields 38 from the permanent magnets being coupled to and through the iron core sections 26A and 26C. See FIG. 5B.

To move the light blocking shields 17 and 19 to their light blocking position, the operator again presses panoramic button 12. In response to button 12 being pressed, microprocessor 34 instructs power supply 32 to place a DC on wires 28, 30 with a polarity opposite to that shown in FIG. 5A. The DC causes an electromagnetic field to emanate from core 26. However, now south poles are at ends 26A and 26c, and a north pole is at middle portion 26B. As described above, electromagnetic field 36 interacts with magnetic fields 38 to induce a force in magnets 16, 18 which rotates shields 17, 19 to back to their light blocking position. The magnetic force generated must be sufficient to overcome the holding force of the stray magnetic fields between the permanent magnets and the iron core sections 26A and 26C.

As previously described, shields 17, 19 are held in their light blocking position after the DC current is shut off due to stray magnetic fields 38 from the permanent magnets being coupled to and through the iron core section 26B. In the light blocking position, the light blocking shields 17 and 19 mask an uppermost rectangular portion and a lowermost rectangular portion of the back frame opening 7 to allow only a panoramic size (about 13.3 mm×36.4 mm) exposure 61 to be made on the filmstrip 9 at the back frame opening. See FIG. 8.

Shields 17, 19 are moved to the desired position immediately following a depression of panoramic button 12. A potential problem with such an arrangement is that a physical shock to the camera may cause the shields to be moved out of the desired location. In order to solve this potential problem, microprocessor 34 can delay movement of the shields until just after shutter button 2 has been pressed and before the shutter is opened. By moving the shields 17,19 to the desired position just prior to picture taking, the shields will be in the correct position irregardless of previous physical shocks to the camera.

The invention has been described with reference to a preferred embodiment. However, it will be appreciated that variations and modifications can be effected within the ordinary skill in the art without departing from the scope of the invention.

PARTS LIST FOR FIGS. 1–8

1. photographic camera
2. shutter button
3. camera body 4. flash
5. taking lens
6. zoom buttons
7. back frame opening
8. mode button
O. optical axis
9. filmstrip
10. LCD
11. cartridge-receiving chamber
12. panoramic button
13. other chamber
14. light-locked chamber
15. light blocking shield assemblage
16 & 18. permanent magnets
17 & 19. light blocking shields
20. opaque wall
21 & 23. pivot shafts
22. chamber
33, 35, 37, & 39. opposite ends of pivot shafts 21 & 23
24. electromagnet
25. arrows
26. iron core
28, 30. wires
32. power supply
34. microprocessor
36. electromagnetic field
38. magnetic field
41, 43, 45, & 47. bearing recess-halves
49. front mounting element
51. rear mounting element
61. panoramic size exposure
63. full size exposure

I claim:

1. A camera comprising a taking lens and at least one light blocking shield which is movable between (1) a light blocking position in which light passing through the taking lens is partially blocked from reaching an image recording surface such that a reduced size image can be recorded on the image recording surface and (2) a normal position in which light passing through said taking lens is not blocked by said light blocking shield such that a normal image can be recorded on said image recording surface, is characterized by:

means for magnetically moving said light blocking shield between said light blocking and normal positions, said magnetic moving means including a permanent magnet attached to said light blocking shield, said permanent magnet having a first magnetic field, and a selectively energizable electromagnet having a second magnetic field when energized, said first and second magnetic fields interacting to cause said light blocking shield to be moved between said light blocking and normal positions.

2. The camera of claim 1, wherein said light blocking shield will remain in said light blocking or normal position when said electromagnet is deenergized, due to said first magnetic field interacting with said electromagnet.

3. The camera of claim 1, wherein said permanent magnet and said electromagnet are separated by an opaque, physical barrier which partially defines a light-locked chamber within the camera.

4. The camera of claim 1, wherein said electromagnet is energized just prior to recording an image on said image recording surface to ensure said light blocking shield is correctly located in said light blocking or normal position.

5. The camera of claim 1, wherein said at least one light blocking shield includes a pair of light blocking shields each movable between said light blocking and normal positions.

6. The camera of claim 1, wherein said light blocking position is a panoramic position used to record vertically reduced images on said image recording surface.

* * * * *